Dec. 8, 1953  N. BREWER  2,662,223
TELEMETERING IMPEDANCE BRIDGE
Filed July 22, 1949  3 Sheets-Sheet 1
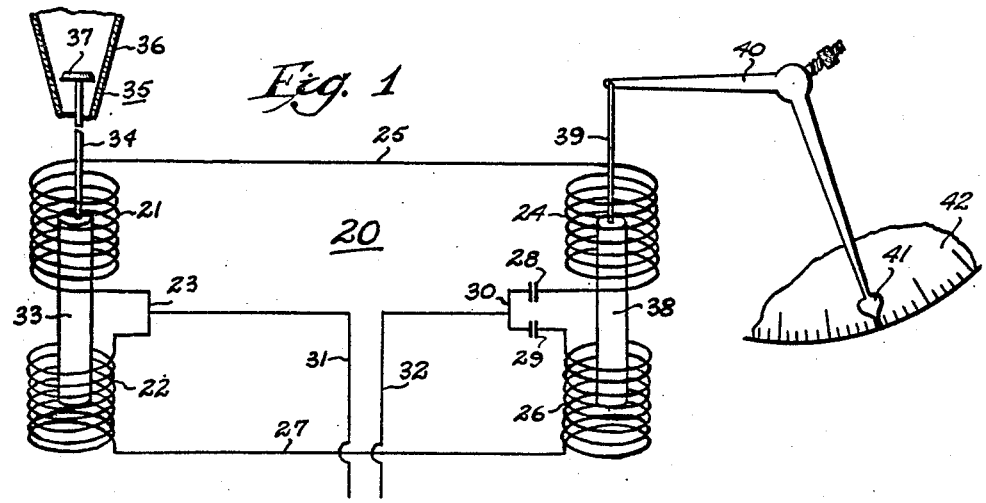
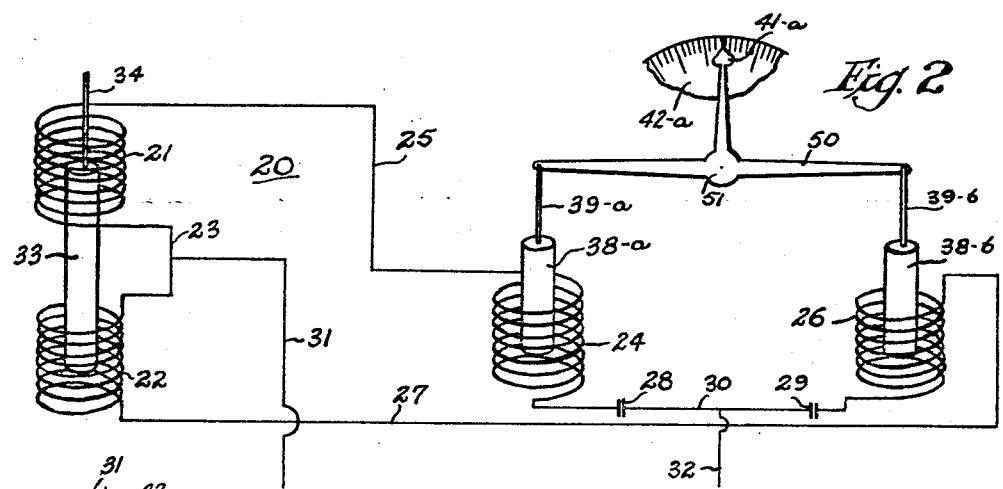
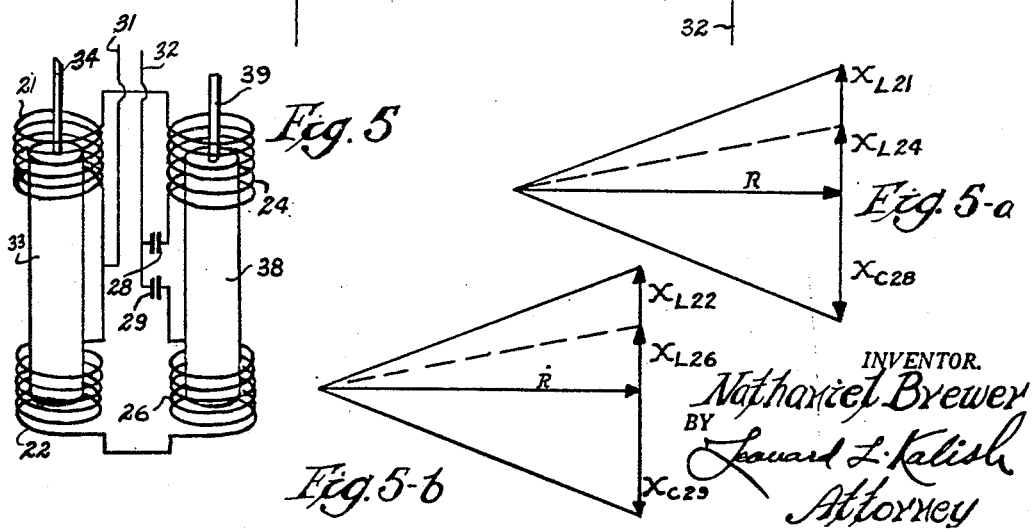
INVENTOR.
Nathaniel Brewer
BY Leonard L. Kalish
Attorney

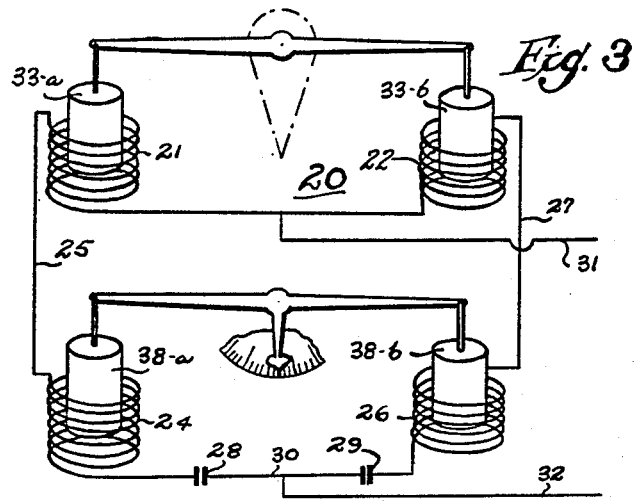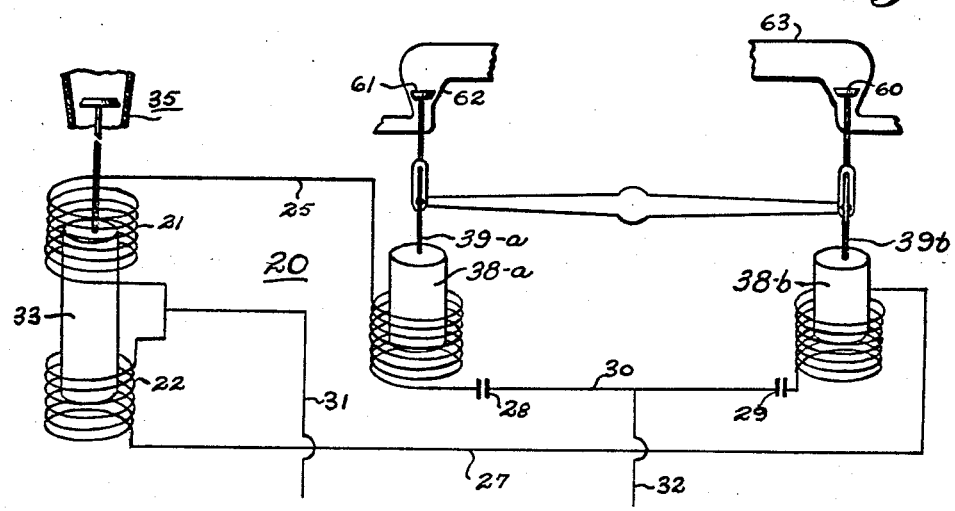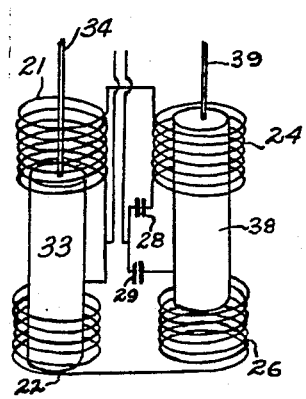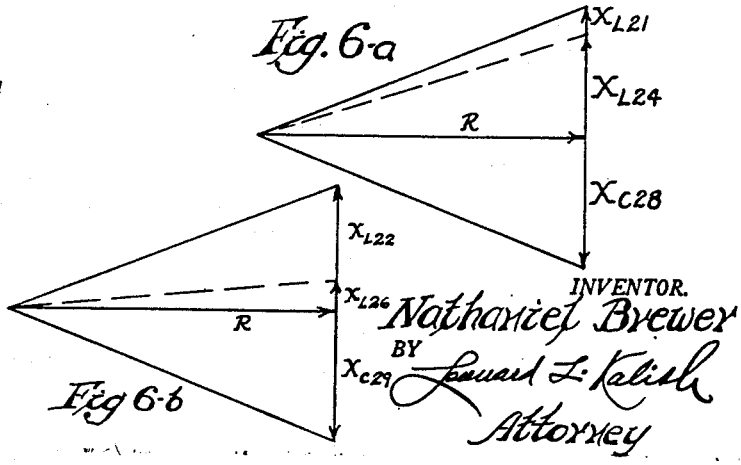

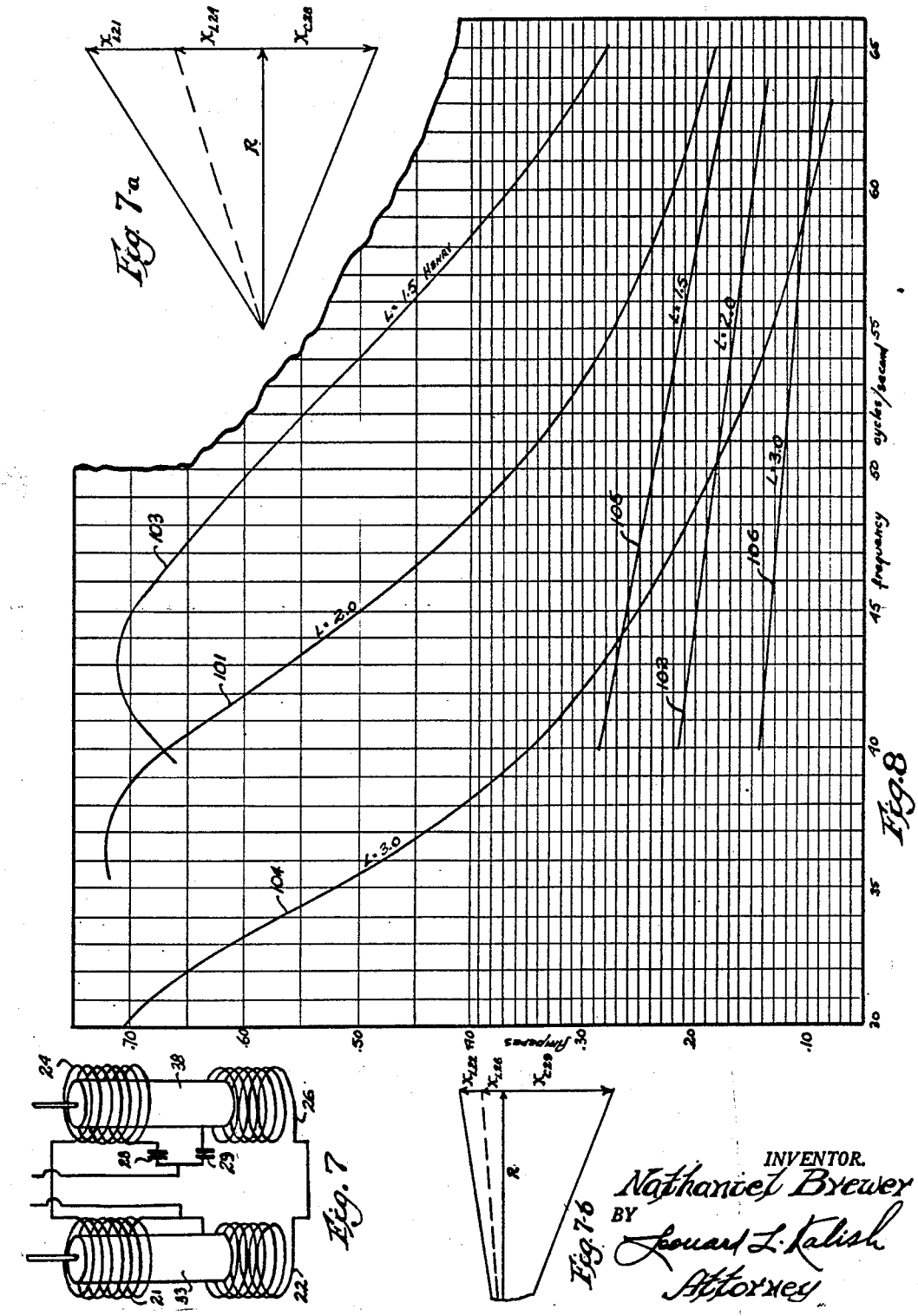

Patented Dec. 8, 1953

2,662,223

UNITED STATES PATENT OFFICE 2,662,223

TELEMETERING IMPEDANCE BRIDGE

Nathaniel Brewer, Newtown, Pa., assignor to Fischer & Porter Company, Hatboro, Pa., a corporation of Pennsylvania Application July 22, 1949, Serial No. 106,171

10 Claims. (Cl. 340—199)

The present invention relates to a new and useful electrical impedance bridge circuit for remote-indicating or telemetering purposes as well as for other remote-indicating and remote-control purposes.

The object of the present invention is to provide an electrical telemetering impedance bridge which will give a larger force-output or positioning-force effective upon the receiver armature and which will be more free of changes in applied voltage, frequency and temperature than telemetering impedance bridges heretofore known.

A further object of the present invention is to provide a simple and yet more effective electrical telemetering impedance bridge for use in remote-indicating instruments and in remote-recording instruments and in remote-controlling instruments and in electrically-connected servo mechanisms.

With the above and other objects in view, which will appear more fully from the following description and accompanying drawings, the present invention consists of an electrical telemetering impedance bridge, the legs or circuits of which are made to resonate or to approach resonance with the frequency of the applied alternating current under pre-determined conditions. In the present embodiment of the invention, the impedance bridge includes a fixed capacitor in series with a series-connected transmitter and receiver coil in each circuit of the bridge—the total inductive reactance of each circuit of the bridge (namely, the sum of the inductive reactance of one-half of the transmitter field [i. e. one transmitter-coil] and the inductive reactance of one-half of the receiver field [i. e. one receiver-coil] and the inductive reactance of the intervening series-connection therebetween) being equal to or preferably slightly greater than the capacitive reactance of the same circuit (including the aforesaid condenser capacitor) at a resonant frequency of less than the frequency of the input current.

In the impedance bridge of the present invention, the total impedance in each circuit (including a series-connected transmitter-coil, receiver-coil and condenser with the intervening connections therebetween) remains constant (or very nearly constant), with both armatures free to move to their respective balance or null position, regardless of the position of the movable transmitter-core in the transmitter field, because the impedance bridge is arranged so that the movable receiver-core or armature in the receiver-field will complement the movement of the transmitter core or armature—that is, as the transmitter-core moves further into one of the two transmitter coils and moves further out of the other transmitter coil), the receiver-armature will move correspondingly or proportionately farther out of the receiver-coil series-connected to the transmitter coil into which the transmitter armature has moved until the sum total of the impedance of each circuit, with the armatures in their new positions, will equal the total impedance of each circuit with the armatures in the former balance or null position. The condenser in series with each transmitter-coil and receiver-coil is preferably of such magnitude that the capacitive reactance of such condenser (and of the circuit in which it is disposed in series) is equal to or preferably slightly less than the maximum total inductive reactance of the circuit in which it is disposed. Under these conditions the circuit will resonate or approach resonance with a frequency slightly less than the frequency of the applied current (because the capacitive reactance cancels out the inductive reactance of the circuit); permitting more current to flow through the circuit, whereby a much greater force can be transmitted and applied to the receiver-armature and hence to the indicating stylus or to the recording pointer and to the remote-controlled element connected thereto.

Moreover, since each circuit of the bridge approaches resonance with the frequency of the applied current under normal operating conditions (i. e., as the receiver armature reaches or approaches its balance or null point), the current flowing in each of the bridge-circuits of the present invention comes more closely into phase with the applied voltage, and the phase-angle between the voltage and the current decreases. In an impedance-circuit the current lags behind the voltage, the in-phase portion of which produces power, but the out-of-phase portion merely producing heat. As the phase-angle is decreased, the heat losses due to excessive current-lag are eliminated or decreased and more effective current will flow through the bridge-circuit. In addition to increasing the flow of current in the impedance bridge of the present invention by keeping the bridge-circuit at resonance or approaching resonance, additional power-producing effective current wil be available due to the decrease in phase-angle between the voltage and the current.

The basic impedance-bridge, over which the present invention is an improvement, has long been known in the art, and was described in the early Bard Patent 1,028,851, issued on June 11, 1912. The Bard patent contemplated a transmitter field and a receiver field with their respective outer ends series connected, and with a current input to the mid-point of each field (such current input dividing each field into two field-coils or sections). Bard's coils were movable and disposed about stationary iron cores, whereby the said coils could move to or from said cores so as to increase or decrease the inductance of said coils. As the inductance in one of the transmitter-coils was increased (with the corresponding decrease in the inductance of the other transmitter-coil), the current-flow through the first transmitter coil would decrease and through the second transmitter-coil would increase. As the current was increased through the second transmitter-coil (and through the second receiver-coil series-connected thereto) the second receiver coil would be drawn more closely to its corresponding receiver-core until the sum total of the impedance of the bridge circuit including the first transmitter coil and the first receiver-coil (series connected thereto) was equal to the sum total of the impedance of the bridge circuit including the second receiver-coil (series connected thereto).

The aforementioned basic impedance-bridge had many inherent disadvantages, however. The most marked of these disadvantages was the fact that the coils and the corresponding cores had physical and electrical characteristics which prevented a relatively large flow of current through the coils. Inasmuch as the coils and cores are drawn toward each other with a force equal to the square of the current (in amperes) flowing through said coil (i. e. $N^2I^2$) when the cores are unsaturated (and with a force substantially proportional to ampere-turns, instead of ampere-turns squared, when the cores are saturated), and said current-value was of a low magnitude, the force with which the coils were drawn into position about their corresponding cores was relatively low. In addition, the bridge-circuits were sensitively responsive to any variation in the voltage or in the frequency of the applied alternating current, so that the force which held the coils in position was a fluctuating one, varying with a change in voltage and change in phase-angle between the current and voltage.

Some of the inherent disadvantages of Bard's impedance bridge were partly overcome in the Harrison Patent No. 1,743,852, issued on January 14, 1930. Harrison modified Bard's impedance bridge by providing one current-input common to one end of the transmitter field and one end of the receiver field and another current-input common to the other end of the transmitter field and the other end of the receiver field, and a null wire or connection from the mid-point of the transmitter field to the mid-point of the receiver field (such null wire thereby dividing each field into two corresponding field coils or field sections and similarly dividing the bridge into two circuits). In Harrison's impedance bridge, the equilibrium or balance established between the corresponding legs or circuits of the bridge (as indicated by the total impedance of each bridge-circuit) is more linear than in Bard's impedance bridge, with a corresponding improvement in the output characteristics or receiver-core positioning-force of the bridge. Harrison's impedance bridge affords an improvement over Bard's impedance bridge, in the manner in which the current divides around the legs or circuits of the bridge, and in the positioning force acting upon the receiver-armature.

In order to increase the receiver-armature positioning-force (i. e., $N^2I^2$), or preferably NI since the circuit should operate with substantially saturated armatures to avoid error with variation of line voltage which drives the receiver-armature into and retains it in position (so as to establish a balance in the respective legs or circuits of the bridge), it is necessary to increase the number of turns of wire (N) in the receiver-coils or to increase the magnitude of the current (I) which flows through the receiver-coils. It is more desirable to increase the value of the current than to increase the number of turns of wire in the coil, inasmuch as increasing the number of the wire-turns in the coil adds more wire-resistance to the circuit, which, in turn, decreases the current-flow therethrough. By simultaneously increasing the diameter of the wire (to reduce the wire-resistance thereof), the effective diameter of the coil is increased, since a larger diameter wire adds additional wire farther from the axis of the armature. Since only the in-phase current combines with the voltage to produce effective power (as represented by the well-known formula $IE=W$), while the component which is out-of-phase requires wire of a larger diameter than would be required if all of the current were in-phase with the voltage, therefore, I reduce the phase-angle.

In the impedance bridge of the present invention, having a condenser series-connected in each bridge-circuit, the coils and condenser in each circuit are so proportioned that each bridge-circuit will resonate slightly below the frequency of the applied current (when the armatures are at their null or balance position). With this relationship between the condenser and the coils in series with it, the current-flow through the two circuits of the impedance bridge will be increased since the resistance to flow of current through the circuits is approximately equivalent to the resistance of the wire in the circuit. The phase-angle between the applied voltage and the applied current is reduced so that substantially all of the current flowing through each circuit is effective power-producing current and very little is out-of-phase, heat-producing current. Thus, for the same size wires, more effective power may be applied to position the receiver-armature, or conversely, an equivalent effective, power-producing force can be achieved by passing less current through the wires inasmuch as substantially all of this current is used to produce receiver-armature positioning force.

If the transmitter-armature is moved from its null or balanced position in relation to the transmitter-field (as is the case when a rotameter float connected to the transmitter-armature moves in response to a change in condition of the fluid or material being measured by the rotameter) and, instead of permitting the receiver-armature to move to a corresponding or proportionate position of balance within the receiver-field, the receiver-armature is forcefully restrained (in its former null, but now out-of-balance position), the total impedance of the circuit including the transmitter coil into which the transmitter armature has moved more fully will be increased so that the sum total of the impedances of that circuit will exceed the impedance which exists when the transmitter armature and the receiver armature are in balanced or null position. Likewise, the total inductance of the circuit including the transmitter-coil from which the transmitter armature has moved will be decreased. In this condition, the circuit having the greater impedance will have less current flowing through it and the circuit having the lesser impedance will have relatively more current flowing through it, which additional flow of current in the second-named circuit will increase the force acting on the receiver armature to pull it from its unnaturally restrained position to a point of balance. With the condensers heretofore described in series in the respective circuits, the force acting upon the receiver-coil (in its unnaturally restrained position) is far in excess of the force acting upon a similar receiver-armature in a circuit which does not include the condensers. This greater force may be as much as two to three times as much as the force acting upon the receiver-armature in a circuit not having a condenser therein (and in actual production devices the force has been found to be as much as 6 times as great).

The positioning force upon the receiver-armature is directly related to the rate-of-change of current for any percentage of axial movement of the armature in relation to the receiver-coils, the rate-of-change of current per unit travel of the armature is greater when the circuits of the present invention are employed than when previous circuits are used. Thus, the receiver-armature will respond more rapidly to any change of condition when the circuit of the present invention is used than when the circuits heretofore known are employed.

In considering the impedance bridge of the present invention, the transmitter-field thereof may be regarded either as a single coil with the electric current-input connected to the mid-point of the coil, and the receiver-field thereof similarly regarded as a single coil with the electric current-input connected to the mid-point of the coil, or each of these two fields, namely, the transmitter-field and the receiver-field may be regarded as each composed of a pair of coils connected in series with each other, with one electric current-input connected to the series-connection intermediate the pair of transmitter-coils and the other electric current-input connected to the series-connection intermediate the pair of receiver-coils. The outer or "free" ends of the transmitter-field and of the receiver-field are, in turn, connected in series with each other (that is, one free end of the transmitter-field connected to one free end of the receiver-field and the other free end of the transmitter-field connected to the other free end of the receiver-field). A separate capacitor is series-connected with each half or coil, respectively, of the receiver-field. The series interposition of each of the capacitors can be made either on the input side of the respective half or coil of the receiver-field or on the respective opposite or outer or "free" ends of the receiver-field (which outer or free ends are connected in series with the corresponding outer or free ends of the transmitter-field).

Referring to the drawings, wherein like reference characters indicate like parts.

Figure 1 is a schematic representation of an impedance bridge of the present invention shown in an embodiment wherein a single transmitter armature is employed in both of the transmitter coils and wherein a single receiver-armature is employed in both of the receiver coils, and the transmitter-armature is operatively connected to a flow-responsive device such as the float of a rotameter, and the receiver-armature is operatively connected to a pointer or indicating arm operating upon a calibrated scale or dial or the like.

Figure 2 is a schematic representation of an impedance bridge circuit of the present invention in an embodiment wherein a single transmitter armature is employed and adapted to operate within both transmitter coils and wherein individual receiver-armatures are adapted to operate in each of the receiver-coils; said receiver-armatures operatively inter-connected by a rocker-arm or beam or the like, to which a pointer, operating in conjunction with a calibrated scale, is attached.

Figure 3 is a schematic representation of an impedance bridge circuit of the present invention in an embodiment wherein individual transmitter-armatures are disposed in each of the transmitter-coils and individual receiver-armatures are disposed in each of the receiver-coils—said transmitter-armatures operatively inter-connected to a rocker-arm or beam to which a flow-responsive device may be connected, and said receiver-armatures operatively inter-connected by a rocker-arm or beam to which an indicating-pointer may be attached.

Figure 4 is a schematic representation of an impedance bridge circuit of the present invention in an embodiment having transmitter-coils and a transmitter-armature similar to Figures 1 and 2, and having individual receiver-armatures disposed in each of the receiver-coils; said receiver-armatures operatively connected to control-valves whereby one valve will be opened as the other valve simultaneously is closed.

Figure 5 is a schematic representation of an impedance bridge of the present invention having a single transmitter-armature and a single receiver-armature, with each armature equally disposed in each of its two respective coils.

Figure 5–a represents a vector diagram of the comparative values of the inductive reactances and the capacitive-reactance in the upper circuit of the impedance bridge of Figure 5—namely, the circuit including the upper receiver and transmitter-coils.

Figure 5–b is a vector-diagram showing the comparative values of the inductive-reactances and the capacitive-reactance in the lower circuit of the impedance bridge of Figure 5; namely, the circuit including the lower receiver and transmitter-coils.

Figure 6 is a schematic representation of an impedance bridge of the present invention having a single transmitter-armature and a single receiver-armature with each armature unequally disposed in its respective coils, but with the impedance bridge at a null or balanced position.

Figure 6–a represents a vector-diagram of the comparative values of the inductive reactances and capacitive reactance in the upper circuit of the impedance bridge of Figure 6.

Figure 6–b represents a vector diagram of the comparative values of the inductive reactances and capacitive reactance in the lower circuit of the impedance bridge of Figure 6.

Figure 7 is a schematic representation of an impedance bridge of the present invention having a single transmitter-armature and a single receiver-armature, with the receiver-armature unnaturally restrained in a position of unbalance with respect to the transmitter-armature.

Figure 7–a is a vector-diagram of the comparative values of the inductive-reactances and the capacitive-reactance in the upper circuit of the impedance-bridge of Figure 6; namely, the circuit including the upper receiver and transmitter coils.

Figure 7-b is a vector-diagram of the comparative values of the inductive-reactances and the capacitive-reactance in the lower circuit of the impedance-bridge of Figure 6—namely, the circuit including the lower receiver and transmitter coils.

Figure 8 is a graphical representation of actual measured values of current, inductance, and frequency in an impedance bridge of the present invention and also in an impedance bridge not of the present invention—that is, one impedance bridge having condensers in the circuits and one impedance bridge without condensers in the circuits.

The impedance-bridge 20 includes a transmitter-coil 21 series-connected to a second transmitter-coil 22 as by the wire 23, and a receiver-coil 24 series-connected to the first transmitter-coil 21, as by the wire 25, and a second receiver-coil 26 series-connected to the second transmitter-coil 22, as by the wire 27. The two receiver-coils 24 and 26 are inter-connected and having in series therewith and therebetween, two fixed condensers 28 and 29. An inter-connecting wire 30 between the condensers 28 and 29 completes the electrical circuit formed by the coil 21, wire 23, coil 22, wire 27, coil 26, condenser 29, wire 30, condenser 28, coil 24 and wire 25. A current-input wire 31 is connected to the wire 23, while another current-input wire 32 is connected to the wire 30, thus supplying electric current at the mid-point of the series-connected transmitter coils and at the mid-point of the series-connected receiver coils between the condensers 28 and 29.

A movable armature or core 33 is operatively disposed within the transmitter-coils 21 and 22. The transmitter coils 21 and 22 are axially aligned whereby the armature 33 may be simultaneously disposed within each of the coils. The armature 33 is of such length that it will be disposed somewhat short of the opposite or outer "free" ends of the two transmitter coils when centered in relation thereto. Thus, as the transmitter armature is moved from its centered position, it will more completely enter one transmitter coil while it leaves the other transmitter coil less occupied.

The upper end of the transmitter armature 33 may be operatively connected, as by a rod 34, to a flow-responsive element such as the "float" 37 disposed within the metering tube 36 of the rotameter 35. The rotameter 35, shown in fragmentary and diagrammatic or schematic view as a part of Figure 1, may be any rotameter such as shown in U. S. Patents 2,348,733 and 2,441,350, and the arrangement of the transmitter armature 33, in relation to the float 37, may be as shown in the co-pending Brewer application Serial No. 674,996 filed June 7, 1946 now Patent No. 2,557,072, or as shown in U. S. Patent No. 2,414,086, or the connection between the transmitter armature and the rotameter may be arranged in any other suitable manner. Likewise, the actuator element which actuates or moves the transmitter armature 33 may be the movable indicating element not only of a flow-responsive device such as a rotameter, but may be the movable indicating element of a pressure-responsive instrument or a temperature-indicating instrument or any other indicating instrument (to which the transmitter armature will then be connected).

The receiver-coils 24 and 26 are axially aligned and have disposed therewithin a movable armature 38, similar to the transmitter armature 33 heretofore described. The receiver-armature 38, when centered in relation to the two receiver-coils 24 and 26, has its ends somewhat short of the opposite ends of the receiver-coils 24 and 26. One end of the receiver-armature 38 may be operatively connected, as by a rod 39 or the like, to a pointer, indicator or recorder element, as, for instance, to the bell-crank arm 40, whereby the relative position of the receiver-armature 38 within the coils 24 and 26 may be indicated by the pointer-end 41 upon the calibrated scale 42. Thus, any movement of the receiver-armature 38 within the coils 24 and 26 will be visually indicated upon the scale 42 by the pointer 41.

Alternating current of any suitable frequency and voltage is applied through the current-input leads 31 and 32 to the mid-points 23 and 30 of the field-coils of the impedance bridge 20. The current thus applied to the bridge 20 will flow through the coils 21 and 22 and 24 and 26 (and the wires inter-connecting the coils). If the condensers 28 and 29 are identical and if the coils 21 and 22 are of the same physical size and electrical characteristics and the armature 33 is centered (in relation to the two transmitter coils), with the receiver armature 38 correspondingly centered (in relation to the two receiver-coils), the current entering through the wires 31 and 32 will divide equally, one-half going through the circuit including the transmitter-coil 21 and the receiver-coil 24 and the other half going through the circuit including the transmitter-coil 22 and the receiver-coil 26. However, if the transmitter-armature 33 is displaced, off center, in relation to the transmitter-coils 21 and 22 (responsive to a change of position of the rotameter float 37 or responsive to any actuating element of any other indicating instrument), the transmitter-armature 33 will be disposed more completely in one or the other of the transmitter-coils 21 and 22. Assuming that the rotameter-float 37 moves upwardly, so that the transmitter-armature 33 more completely fills the transmitter coil 21 than the coil 22, the impedance of the coil 21 will be increased, as compared to the impedance of the coil 22, and hence, less current will flow through the circuit including the transmitter-coil 21 and receiver-coil 24, than through the circuit including the transmitter coil 22, and its series-connected receiver-coil 26. As more current flows through the receiver-coil 26 and less current flows through the receiver-coil 24, the force acting upon the receiver-armature 38, in an axial direction, becomes greater in a downward direction toward the receiver-coil 26 than in an upward direction toward the receiver-coil 24 (see Figure 1). This axial force upon the receiver-armature 38 draws the receiver-armature 38 more deeply into the receiver-coil 26. As the receiver-armature 38 enters more completely into the receiver-coil 26, the impedance of the coil 26 increases, and the impedance of the receiver-coil 24 decreases so that less current flows through the circuit including the transmitter-coil 22 and the receiver-coil 26, and the flow of current through the circuit including the transmitter-coil 21 and the receiver-coil 24 increases. The armature 38 descends until the total impedance of the circuit including the first transmitter-coil 21 and the first receiver-coil 24 equals the total impedance of the circuit including the second transmitter-coil 22 and second receiver-coil 26. At this point the force acting on the receiver coil stops, the relative movement of cores and coils ceases, and the null-point or point of electrical equilibrium or balance is reached.

By proper calibration, the scale 41 and the pointer 42 will indicate the rate-of-flow of fluid through the flow-responsive instrument 35. The scale and pointer receiver-armature and receiver-coils (with associated parts and connections) of the bridge 20 may be remotely positioned with respect to the flow-responsive instrument 35 and the transmitter-coils and transmitter-armature of the bridge 20, whereby the rate-of-flow will be indicated at a point distant from the actual measurement thereof.

To increase the flow of current through the receiver-coils and to cancel out the inductive-reactance of the bridge circuits, a capacitor 28 is placed in series with the receiver-coil 24, and a capacitor 29 is placed in series with the receiver-coil 26. Without the capacitors 28 and 29, the resistance to the flow of current through the circuits of the impedance bridge is increased by the inductive-reactance of the transmitter coils 21 and 22 and receiver-coils 24 and 26. This is shown schematically in Figure 5–$a$ wherein the vector representation of the resistance (in ohms) of the copper in the circuit including the transmitter-coil 21 and the receiver-coil 24 is represented by the vector-arrow R. The inductive-reactance of the transmitter coil 21 is represented by the vector $X_{L21}$ and of the receiver-coil 24 by the vector $X_{L24}$, and may be shown schematically at right angles to the vector R. The total impedance in the aforementioned circuit (without the condenser 28) is then determined by the formula $$Z = \sqrt{R^2 + (X_{L21} + X_{L24})^2}$$

and represents a value in ohms which resists the flow of current through the circuit including the receiver-coil 24. However, by inserting the condenser 28, a capacitive-reactance is introduced into the circuit, which may be represented on the diagram of Figure 5–$a$ by the arrow $X_{C28}$. The capacitive-reactance of the condenser 28 is opposed to the total inductive reactance of the transmitter coil 21 and the receiver-coil 24 and therefore these vector-representations are shown as lying in opposite directions to each other and at right angles to the vector arrow R. In a circuit of this type wherein a transmitter coil 21, a receiver-coil 24 and a capacitor 28 are placed in series, the total impedance Z of the circuit is represented by the formula $$Z = \sqrt{R^2 + ([X_{L21} + X_{L24}] - X_{C28})^2}$$

Because the value of the capacitive reactance is preferably slightly less than the total inductive reactance of the circuit, the capacitive reactance is subtracted from the sum of the inductive reactances in the foregoing formula.

As is shown in Figure 5–$b$, the impedance of that circuit of the bridge which includes the receiver-coil 26, may be determined by using the vector-representations $X_{L26}$ for the receiver-coil 26, $X_{L22}$ for the transmitter coil 22, and $X_{C29}$ for the condenser or capacitor 29.

It is to be understood that $(X_{L21}+X_{L24})$ and $(X_{L22}+X_{L26})$ represent the inductive reactances of the coils plus the associated series-connections, which reactance may vary slightly from the sum of the reactances of the coils alone. Similarly $X_{C28}$ and $X_{C29}$ represent the total capacitance of the bridge-circuits, not merely the capacitance of the condensers alone.

As is shown in Figures 6, 6–$a$ and 6–$b$, the condition of a tuned or resonant circuit may be reached or approached whenever the transmitter-armature and the receiver-armature are in a null or balanced position any place within their respective coils. Thus, as is shown in Figure 6, the transmitter-armature 33 may be disposed more completely in the transmitter coil 22 than in the transmitter coil 21 and, if the receiver-armature 38 is correspondingly and proportionately disposed more completely in the receiver-coil 24 than in the receiver-coil 26, the sum total of the inductive reactances of the circuit including the coils 21 and 24 will be slightly greater than or equal to the capacitive reactance of the condenser 28 (as is shown in Figure 6–$a$), and likewise the inductive reactances of the coils 22 and 26 will be approximately equal to the capacitive reactance of the condenser 29 (as shown in Figure 6–$b$).

The preferred value of each capacitor is such that the capacitive-reactance will equal the sum of the maximum inductive reactances of the circuit (including the capacitor), at a frequency of approximately 55 cycles (or about 5 cycles below the frequency of the applied current), although in the actual practice of the present invention the resonant frequency may be lower, as, for instance, 40 cycles. When the armatures are disposed at null or balance position the bridge-circuits will resonate at a frequency of a few cycles below the frequency of the applied current. Thus, when the transmitter armature is moved from its position of balance, the resonant frequency of one of the bridge circuits (that into which the receiver-armature will move) approaches or equals the operating frequency of the applied current while the other bridge circuit moves farther from resonance with the frequency of the applied current. Thus, there will be a greater force drawing the receiver armature quickly and positively into a position of balance and less force on the receiver armature to retain it in its former position.

When the transmitter armature 33 is moved from its position of balance (shown in Figure 5) to a new position (responsive to an external force such as the force applied to the rod 34 by the rotameter float 37), as is shown in Figure 6 with the transmitter armature more completely disposed in the lower transmitter-coil 22 than the upper transmitter-coil 21, the axial force acting upon the receiver-armature 38, in an upward direction, will be increased and the axial force acting downwardly upon the receiver-armature 38 will be decreased so that the receiver-armature 38 will be drawn upwardly within the receiver-coil 24 until a null-position or position of electrical balance is reached.

As heretofore stated, the force acting upon the receiver-armature to drive it into position, is dependent upon the number of turns of wire in the receiver-coils and the amount of current flowing through said coils. For any given increment of movement of the transmitter armature in the circuits of the present invention, a relatively greater change in the amount and a relatively greater rate-of-change of current takes place than in impedance bridge circuits of the prior art. Thus, with a given degree of travel of transmitter armature, in a bridge circuit of the present invention, the receiver armature will be urged more quickly and more positively to a null or balance position than would the receiver-armature in impedance bridge circuits of the prior-art.

Referring now to Figure 8 which is a graphical representation of the current, frequency and impedance relationship existing in the circuits of the present invention, it will be noted that the rate-of-change and the amount of change of current flowing through the armature-positioning receiver-coils is far in excess of the change in current-flow (under similar conditions) in an impedance bridge circuit which is not of the present invention.

Assuming that the operating frequency is 60 cycles, and the sum total of the inductance of one circuit including a transmitter coil and its series-connected receiver coil is 2 henrys, then the current flowing through each circuit including one transmitter coil and one receiver coil with the condenser in series therewith, is equal to .22 ampere, as shown by curve 101 on Figure 8. Curve 102, of Figure 8, shows that the current flowing in a similar circuit, under similar conditions, without any condensers in the circuit is equal to .15 ampere. Thus, in a condition of balance or at a null point, there is more current flowing through the circuit with condensers therein, than without the condensers.

Figure 7 is a graphical representation of the situation which prevails if the transmitter armature of Figure 6 is moved more completely into the transmitter coil 21 (responsive to the change of conditions of the flow responsive instrument 35) and the receiver armature 38 is unnaturally restrained within the receiver-coil 24) from moving into a position of balance, where it would occupy more fully the receiver-coil 26 than the receiver coil 24. With the receiver-armature unnaturally restrained in an impedance bridge of the present invention, the force acting upon it (to drive it into a position of balance) can be compared with the comparable force acting upon a receiver-armature under similar conditions in an impedance bridge not having the condensers 28 and 29 in the bridge-circuits. This comparison can be made by referring to Figure 8, wherein the curve 103 represents the inductance value of the circuit including coils 22 and 26 which has a decreased inductance (generally about 1½ henrys) and curve 104 represents the inductance of the circuit including coils 21 and 24, wherein the inductance is equal to approximately 3 henrys. In this circumstance the current flowing through the coil 26 (at a frequency of 60 cycles) is equal to approximately 0.365 ampere, and this increased current tends to draw the armature 38 more completely into the coil 26. The amount of current flowing through the coil 24 (which tends to keep the armature 38 within the receiver-coil 24) is equal to about 0.10 ampere (with reference to the curve 104 of the chart of Figure 8).

By comparison, in bridge-circuits not having condensers therein, the amount of current flowing through the coil 26 (which tends to draw the armature 38 into the coil 26) is only 0.19 ampere, as is shown by the curve 105, while the current tending to keep the armature 38 within the receiver-coil 24 has been reduced only to approximately 0.10 ampere, as is shown by the curve 106 (Figure 8).

Thus it can be seen that the relative values of the current tending to position the receiver armature is much more favorable in the impedance bridge of the present invention than in impedance bridges of the prior art.

Moreover, the rate-of-change of current in the impedance bridge circuit of the present invention is more favorable than in the impedance bridges of the prior art. As is shown by the graph of Figure 8, the rate-of-change of current per given unit of travel of the armatures is higher in an impedance bridge of the present invention than in impedance bridges of the prior art. The rate-of-change of current-flow tending to keep the receiver armature in the receiver coil 24 was 0.22 ampere minus 0.10 ampere or a total change of 0.12 ampere (in the circuit including the transmitter coil 21 and the receiver coil 24) as compared to the change of 0.05 ampere in a similar circuit in an impedance bridge of the prior art.

In the circuit including transmitter coil 22 and receiver coil 26 (which receiver-coil pulls the receiver armature to a point of balance), the rate-of-change of current in the present invention was 0.365 ampere minus 0.22 ampere or a total change of 0.145 ampere, while the comparable change in the circuit not having condensers therein was 0.04 ampere. This more clearly illustrates the fact that the axial force positioning the receiver-armature properly within the receiver-coil at its point of balance with the transmitter-armature 33 (in any position which the transmitter-armature 33 assumes) is greater in the impedance bridge of the present invention which includes condensers in series with the coils than in an impedance bridge of the prior art.

In addition to the increase in current flowing through the particular receiver-coil as the inductance of its circuit decreases and its inductive reactance decreases and its resonant frequency approaches the frequency of the applied current, there is an improved characteristic in the phase-angle between the current and the applied voltage. Thus, when the receiver-armature 38 is in the position shown in Figure 7, there is a relatively large phase-angle between the current and the applied voltage in the circuit including the transmitter-coil 21 and receiver-coil 24, but when the receiver-armature assumes the position shown in Figure 5 or 6 the phase-angle is decreased so that more of the current is in phase with the voltage, and is effective to provide power, and less current is out-of-phase and wasted in heat-loss. All these factors combine to position the receiver-armature 38 positively, accurately and quickly in corresponding or proportionate relationship to the transmitter-armature 33.

With reference now to Figure 2 there is shown a schematic representation of a circuit including the impedance bridge of the present invention, generally similar to that shown in Figure 1, including a pair of axially aligned transmitter-coils 21 and 22 and a transmitter-armature 33 like that shown in Figure 1, but showing the receiver-coils 24 and 26 axially displaced and generally parallel to each other and having a plurality of receiver-armatures 38–a and 38–b operatively interconnected by a rocker-arm or beam 50 pivoted as at 51. A pointer 41–a and a calibrated scale 42–a are operatively disposed with relation to the beam 50 and the pivot 51. The operation of the impedance-bridge in Figure 2 is the same as the operation of the impedance-bridge of Figure 1, but provides an arrangement whereby rotary motion may be transmitted directly to the beam and pointer.

The circuit schematically represented in Figure 3 embodies a plurality of receiver-armatures 38–a and 38–b and receiver-coils 24 and 26 disposed generally in the same fashion as is shown in Figure 2. However, the transmitter coils 21 and 22 in Figure 3 are separate (a separate transmitter-armature 33-a disposed within the coil 21 and a separate transmitter-armature 33-b disposed within the coil 22). In this fashion a rotary motion may be transmitted directly to the transmitter-armatures (to indicate the operation of a rotary mechanism, shown in dash-dot lines in Figure 3) rather than transmitting linear motion, as indicated by the schematic representation of a rotameter, shown in Figures 1 and 2.

The schematic representation shown in Figure 4 indicates how the present invention may be applied to remotely operate a pair of flow-controlling valves, responsive to a signal transmitted from a flow-responsive instrument such as the rotameter 35. The flow-controlling valves 60 and 61 are operatively connected to the ends of the rods 39-a and 39-b, whereby the flow of fluid through the conduits 62 and 63 may be controlled, responsive to any change of flow of the fluid through the flow responsive instrument 35. Because of the additional force acting upon the receiver-armatures 38-a and 38-b (which is far in excess of the receiver-armature positioning-forces developed in impedance-bridges not of the present invention), it is possible to operate the valves 60 and 61 directly from the receiver-armatures 38-a and 38-b—a condition which would not be possible if the force acting upon the receiver-armatures 38-a and 38-b were of a relatively small magnitude.

The transmitter field and the receiver field (consisting of two transmitter coils and two receiver coils, respectively) are wound in a direction so as to produce magnetic fields at each end of each coil which will be of opposite polarity to the magnetic field of the aligned adjacent coil in the field. Thus, with reference to Figure 1, the transmitter coil 21 and the transmitter coil 22 are wound in a direction so that, at any given instant, the magnetic field produced at the center of the armature 33 by the coil 21 is of opposite polarity to the magnetic field produced at the center of the armature 33 by the transmitter coil 22. In like manner the magnetic field produced by the receiver coil 24 at the center of the armature 38 is of opposite polarity to the magnetic field produced at the center of armature 38 by the receiver coil 26, at any given instant. Thus the polarity at the center of the armatures is neutralized and the armatures will not be pulled against the sides of the coil and friction will be reduced to a minimum. Thus the coils are wound in a direction, or physically placed over the armatures in such a manner to produce simultaneously dissimilarly induced poles in their respective armatures whereby to eliminate or reduce magnetic drag.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having described my invention, what I claim as new and desire to protect by Letters Patent is the following:

1. An impedance-bridge including a plurality of transmitter-coils, each with associated transmitter-armature, each transmitter-coil and associated transmitter-armature movable relative to one another, a plurality of receiver-coils and associated receiver-armature, each receiver-coil and associated receiver-armature movable relative to each other, one current-carrying wire connected to one end of each transmitter-coil, another current-carrying wire connected to one end of each of the receiver-coils, one end of each receiver-coil connected to one end of a transmitter-coil, a separate condenser in series with one end of each receiver-coil, the total inductive-reactance of each circuit including a series-connected transmitter and receiver coil being greater than the total capacitive-reactance of the same circuit when the receiver-armature is disposed at its null or balance position within the receiver-coil.

2. An impedance-bridge including a plurality of transmitter-coils, each with associated transmitter-armature, each transmitter-coil and associated transmitter-armature movable relative to one another, a plurality of receiver-coils and associated receiver-armature, each receiver-coil and associated receiver-armature movable relative to each other, one current-carrying wire connected to one end of each transmitter-coil, another current-carrying wire connected to one end of each of the receiver-coils, one end of each receiver-coil connected to one end of a transmitter-coil, a separate condenser in series with one end of each receiver-coil, each circuit including a receiver-coil and its series-connected transmitter-coil resonating at a lower frequency than the frequency of the applied current when the impedance-bridge is balanced.

3. An impedance-bridge including a plurality of transmitter-coils, each with associated transmitter-armature, each transmitter-coil and associated transmitter-armature movable relative to one another, a plurality of receiver-coils and associated receiver-armature, each receiver-coil and associated receiver-armature movable relative to each other, the outer or free end of each transmitter-coil being connected in series with the outer or free end of a receiver-coil, and the inner end of each transmitter-coil and the inner end of each receiver-coil connected together, a current-input lead connected in common to the outer end of one transmitter-coil and the outer end of one receiver-coil and a second current-input wire connected in common to the outer end of the other receiver and transmitter-coils, a separate condenser in series with one end of each receiver-coil, the total inductive-reactance of each circuit including a series-connected transmitter and receiver-coil being greater than the total capacitive-reactance of the same circuit when the receiver-armature is disposed at its null or balance position within the receiver-coil.

4. An impedance-bridge including a plurality of transmitter-coils and a plurality of receiver-coils, a separate transmitter-armature associated with each transmitter-coil and movable relative thereto, a plurality of receiver-coils, a separate receiver-armature associated with each receiver-coil and movable relative thereto, one end of each of said transmitter-coils connected together and to an input current-carrying wire, one end of one of said receiver-coils connected to one end of one of said transmitter-coils and one end of the other of said receiver-coils connected to one end of the other of said transmitter-coils, a second current-carrying wire connected to one end of each of said receiver-coils, a separate condenser in series with one end of each receiver-coil, the total inductive-reactance of each circuit including a series-connected transmitter and receiver coil being greater than the total capacitive-reactance of the same circuit when the receiver-armature is disposed at its null or balance position within the receiver-coil.

5. An impedance-bridge including a plurality of transmitter-coils and a plurality of receiver-coils, a single transmitter-armature associated with all transmitter-coils and movable relative thereto, a plurality of receiver-coils, a separate receiver-armature associated with each receiver-coil and movable relative thereto, one end of each of said transmitter-coils connected together and to an input current-carrying wire, one end of one of said receiver-coils connected to one end of one of said transmitter-coils and one end of the other of said receiver-coils connected to one end of the other of said transmitter-coils, a second current-carrying wire connected to one end of each of said receiver-coils, a separate condenser in series with one end of each receiver-coil, the total inductive-reactance of each circuit including a series-connected transmitter and receiver-coil being greater than the total capacitive-reactance of the same circuit when the receiver-armature is disposed at its null or balance position within the receiver-coil.

6. An impedance-bridge including a plurality of transmitter-coils and a plurality of receiver-coils, a separate transmitter-armature associated with each transmitter-coil and movable relative thereto, a plurality of receiver-coils, a single receiver-armature associated with all receiver-coils and movable relative thereto, one end of each of said transmitter-coils connected together and to an input current-carrying wire, one end of one of said receiver-coils connected to one end of one of said transmitter-coils and one end of the other of said receiver-coils connected to one end of the other of said transmitter-coils, a second current-carrying wire connected to one end of each of said receiver-coils, a separate condenser in series with one end of each receiver-coil, the total inductive-reactance of each circuit including a series-connected transmitter and receiver-coil being greater than the total capacitive-reactance of the same circuit when the receiver-armature is disposed at its null or balance position within the receiver-coil.

7. An impedance-bridge including a plurality of transmitter-coils, each with associated transmitted-armature, each transmitter-coil and associated transmitter-armature movable relative to one another, a plurality of receiver-coils and associated receiver-armature, each receiver-coil and associated receiver-armature movable relative to each other, the outer or free end of each transmitter-coil being connected in series with the outer or free end of a receiver-coil, and the inner end of each transmitter-coil and the inner end of each receiver-coil connected together, a current-input lead connected in common to the outer end of one transmitter-coil and the outer end of one receiver-coil and a second current-input wire connected in common to the outer end of the other receiver and transmitter-coils, a separate condenser in series with one end of each receiver-coil, each circuit including a receiver-coil and its series-connected transmitter-coil resonating at a lower frequency than the frequency of the applied current when the impedance-bridge is balanced.

8. An impedance-bridge including a plurality of transmitter-coils and a plurality of receiver-coils, a separate transmitter-armature associated with each transmitter-coil and movable relative thereto, a plurality of receiver-coils, a separate receiver-armature associated with each receiver-coil and movable relative thereto, one end of each of said transmitter-coils connected together and to an input current-carrying wire, one end of one of said receiver-coils connected to one end of one of said transmitter-coils and one end of the other of said receiver-coils connected to one end of the other of said transmitter-coils, a second current-carrying wire connected to one end of each of said receiver-coils, a separate condenser in series with one end of each receiver-coil, each circuit including a receiver-coil and its series-connected transmitter-coil resonating at a lower frequency than the frequency of the applied current when the impedance-bridge is balanced.

9. An impedance-bridge including a plurality of transmitter-coils and a plurality of receiver-coils, a single transmitter-armature associated with all transmitter-coils and movable relative thereto, a plurality of receiver-coils, a separate receiver-armature associated with each receiver-coil and movable relative thereto, one end of each of said transmitter coils connected together and to an input current-carrying wire, one end of one of said receiver-coils connected to one end of one of said transmitter-coils and one end of the other of said receiver-coils connected to one end of the other of said transmitter-coils, a second current-carrying wire connected to one end of each of said receiver-coils, a separate condenser in series with one end of each receiver-coil, each circuit including a receiver-coil and its series-connected transmitter-coil resonating at a lower frequency than the frequency of the applied current when the impedance-bridge is balanced.

10. An impedance-bridge including a plurality of transmitter-coils and a plurality of receiver-coils, a separate transmitter-armature associated with each transmitter-coil and movable relative thereto, a plurality of receiver-coils, a single receiver-armature associated with all receiver-coils and movable relative thereto, one end of each of said transmitter-coils connected together and to an input current-carrying wire, one end of one of said receiver-coils connected to one end of one of said transmitter-coils and one end of the other of said receiver-coils connected to one end of the other of said transmitter-coils, a second current-carrying wire connected to one end of each of said receiver-coils, a separate condenser in series with one end of each receiver-coil, each circuit including a receiver-coil and its series-connected transmitter-coil resonating at a lower frequency than the frequency of the applied current when the impedance-bridge is balanced.

NATHANIEL BREWER.

References Cited in the file of this patent

UNITED STATES PATENTS

| Number | Name | Date |
|---|---|---|
| 1,743,852 | Harrison | Jan. 14, 1930 |
| 2,070,743 | McDonnell | Feb. 16, 1937 |
| 2,154,156 | Turner | Apr. 11, 1939 |
| 2,363,690 | Razek | Nov. 28, 1944 |
| 2,390,463 | Roters | Dec. 4, 1945 |
| 2,407,141 | Coake | Sept. 3, 1946 |
| 2,417,292 | Coake | Mar. 11, 1947 |
| 2,420,160 | Adamson | May 6, 1947 |
| 2,457,727 | Rifenberg | Dec. 28, 1948 |

FOREIGN PATENTS

| Number | Country | Date |
|---|---|---|
| 501,581 | Great Britain | Mar. 1, 1939 |